(12) United States Patent
Piotrowski

(10) Patent No.: US 9,851,024 B2
(45) Date of Patent: Dec. 26, 2017

(54) PASS THROUGH FITTING FOR CABLES AND THE LIKE

(71) Applicant: Loren Piotrowski, Toledo, OH (US)

(72) Inventor: Loren Piotrowski, Toledo, OH (US)

( * ) Notice: Subject to any disclaimer, the term of this patent is extended or adjusted under 35 U.S.C. 154(b) by 0 days.

(21) Appl. No.: 15/164,131

(22) Filed: May 25, 2016

(65) Prior Publication Data

US 2017/0343135 A1 Nov. 30, 2017

(51) Int. Cl.
*F16L 5/00* (2006.01)
*F16L 39/00* (2006.01)
*H02G 3/00* (2006.01)
*F16B 33/00* (2006.01)
*F16B 35/02* (2006.01)
*F16B 39/12* (2006.01)

(52) U.S. Cl.
CPC .............. *F16L 5/00* (2013.01); *F16B 33/004* (2013.01); *F16B 35/02* (2013.01); *F16B 39/12* (2013.01)

(58) Field of Classification Search
None
See application file for complete search history.

(56) References Cited

U.S. PATENT DOCUMENTS

| | | | |
|---|---|---|---|
| 625,448 A | 5/1899 | Jaenichen | |
| 919,913 A | 4/1909 | Miller | |
| 1,441,138 A | 1/1923 | Westervelt | |
| 1,805,155 A | 5/1931 | Weeks | |
| 1,879,920 A | 9/1932 | Church | |
| 2,250,685 A | 7/1941 | Tiefenbacher et al. | |
| 2,431,154 A | 11/1947 | Wikstrom | |
| 2,530,258 A | 11/1950 | Marsan | |
| 2,647,942 A | 8/1953 | Borden et al. | |
| 2,674,470 A | 4/1954 | Appleton | |
| 3,142,500 A | 7/1964 | Wesseler | |
| 3,160,055 A | 12/1964 | Devine et al. | |
| 3,224,796 A * | 12/1965 | Burkitt | F16L 5/022 174/153 R |
| 3,397,901 A | 8/1968 | Larrivee | |
| 3,649,054 A | 3/1972 | McClenan | |
| 3,679,237 A | 7/1972 | De Angelis | |
| 3,734,547 A | 5/1973 | Kojima | |
| 3,761,601 A | 9/1973 | Kaesser et al. | |
| 3,836,269 A * | 9/1974 | Koscik | F16J 15/02 16/2.2 |
| 3,880,453 A | 4/1975 | Philibert et al. | |
| 4,095,914 A | 6/1978 | Thomsen | |
| 4,132,146 A | 1/1979 | Uhlig | |
| 4,343,496 A | 8/1982 | Petranto | |
| 4,379,204 A | 4/1983 | Perrault et al. | |
| 4,750,762 A | 6/1988 | Corzine | |
| 4,863,198 A | 9/1989 | Petranto | |
| 5,226,678 A | 7/1993 | Petranto | |
| 5,368,336 A | 11/1994 | Van Vleet et al. | |

(Continued)

*Primary Examiner* — Dimary Lopez Cruz
(74) *Attorney, Agent, or Firm* — David C. Purdue

(57) ABSTRACT

A pass through fitting for a cable or the like comprises a split bolt having a threaded shank and a nut which can be locked on the shank to prevent rotation therebetween. A passageway extends through the split bolt for receiving one or more cables. The fitting would be supported in a structure, such as a boat hull, through which it is desired to run the cable. The fitting may be sealed at the head, against the structure, to be watertight.

19 Claims, 6 Drawing Sheets

(56) References Cited

U.S. PATENT DOCUMENTS

| | | | | |
|---|---|---|---|---|
| 5,382,752 | A | * | 1/1995 | Reyhan .................. H02G 3/088 |
| | | | | 174/38 |
| 5,594,202 | A | | 1/1997 | Tobias |
| 5,598,806 | A | | 2/1997 | Stivers |
| 5,921,734 | A | | 7/1999 | Kataoka |
| 6,048,151 | A | * | 4/2000 | Kwee ..................... F16B 39/06 |
| | | | | 411/217 |
| 6,180,882 | B1 | | 1/2001 | Dinh |
| 6,274,812 | B1 | | 8/2001 | Dauoud |
| 6,981,723 | B2 | | 1/2006 | Landvik |
| 7,132,605 | B2 | | 11/2006 | Holmberg et al. |
| 7,273,985 | B2 | | 9/2007 | Holmberg et al. |
| 7,661,915 | B2 | | 2/2010 | Whipple |
| 7,937,818 | B2 | | 5/2011 | Holmberg et al. |
| 8,275,229 | B2 | * | 9/2012 | Shimirak ............. H02G 15/013 |
| | | | | 174/77 R |
| 9,312,672 | B2 | * | 4/2016 | Hill ...................... H02G 3/0675 |
| 2009/0025977 | A1 | * | 1/2009 | Anderson ........... H02G 3/0675 |
| | | | | 174/653 |
| 2010/0059939 | A1 | | 3/2010 | Davison |
| 2012/0082527 | A1 | | 4/2012 | Grether et al. |
| 2015/0083486 | A1 | | 3/2015 | Hill et al. |

* cited by examiner

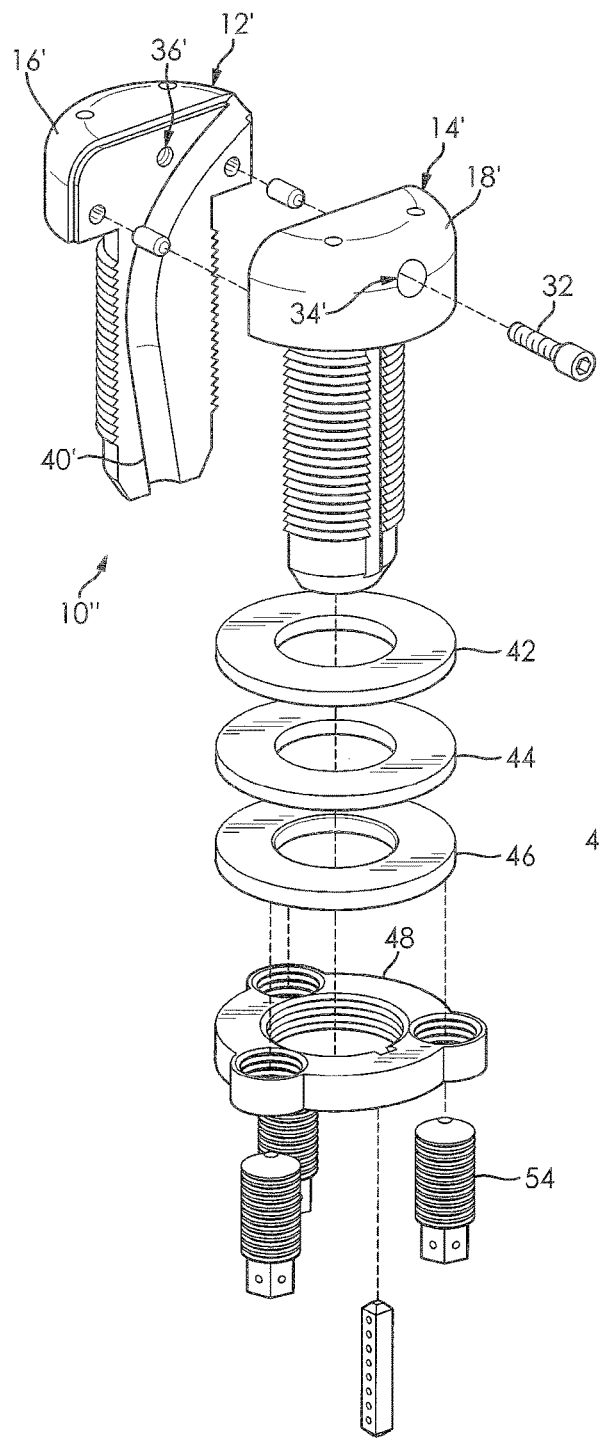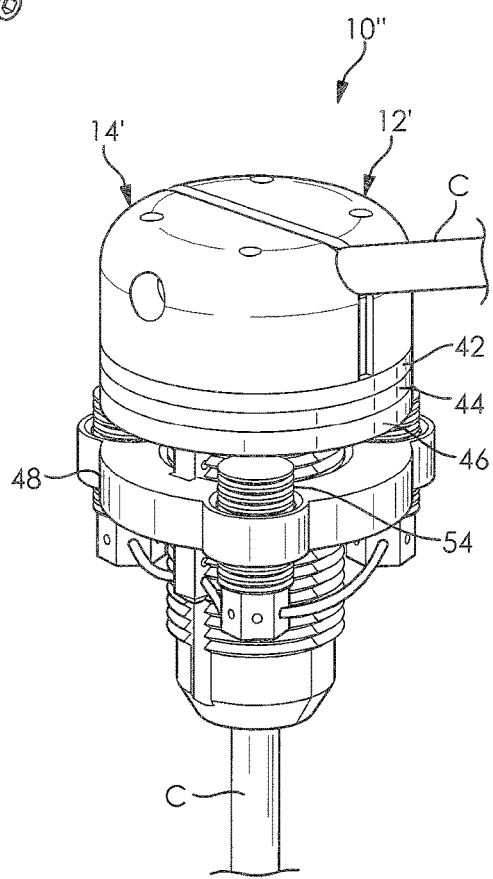
FIG. 6
FIG. 7

PASS THROUGH FITTING FOR CABLES AND THE LIKE

I. BACKGROUND

A. Technical Field

Provided is a fitting for sealing around an opening in a hull, or the like, and for sealing around a cable passing therethrough.

B. Description of Related Art

During a search directed to the subject matter of the invention, the following U.S. patents were noted: U.S. Pat. Nos. 7,937,818; 7,661,915; 7,273,985; 7,132,605; 6,981,723; 6,274,812; 6,180,882; 5,921,734; 5,598,806; 5,594,202; 5,368,336; 5,226,678; 4,863,198; 4,750,762; 4,716,962; 4,379,204; 4,343,496; 4,132,146; 4,095,914; 3,880,453; 3,761,601; 3,734,547; 3,679,237; 3,649,054; 3,397,901; 3,224,796; 3,160,055; 3,142,500; 2,674,470; 2,647,942; 2,530,258; 2,431,154; 2,250,685; 1,879,920; 1,805,155; 1,441,138; 919,913; and 625,448. In addition, the following published US patent applications were noted: 20150083486; 20120082527; and 20100059939.

Watercraft owners utilize various electronic devices such as fish finders, depth finders, GPS and sonar, to name a few. These devices have base units which are mounted inside of the craft and transducers which are mounted outside of the hull, below the waterline. Cables connect the base units to the transducers. In a typical installation, the cable passes through the hull, and there's the rub. Installation requires drilling a hole through the hull so that the cable can be connected to the base unit mounted on the watercraft and to the transducer outside of the watercraft. It is a serious matter to put a hole through the hull of a watercraft. Steps must be taken to ensure that, after a cable is passed through a hole, the hole is sealed.

One approach taken previously is to drill a small hole through the transom of a size sufficient to permit the cable to pass through. However, cables used to connect transducers, and the like, to watercraft electronic base units inside the watercraft are provided with permanent, i.e., non-removable, molded fittings, which are received in sockets in the base units. These fittings are much larger than the cables to which they are attached and such fittings will not pass through a small hole in a transom. Therefore, in order to use this approach, the cable must be cut, passed through the hole in the transom, and spliced back together to reattach the fitting. While this approach has the advantage of only requiring a small hole through the transom, cutting and splicing a cable, particularly one that will be used in a marine environment, is a bad idea. Manufacturers of watercraft electronics uniformly advise against cutting and splicing connector cables and doing so will void the warranties offered by these manufacturers. More to the point, regardless of the care and effort that is put into properly splicing a cut cable, marine environments are harsh and such splices are prone to failure.

Another solution offered by the prior art is a device known as a clam shell pass through fitting, one of which is available commercially from Blue Sea Systems under the name Cable Clam. This device is said to have the advantage that a cable, with the fitting attached, can be passed through a large hole in the transom and the device can be installed from the outside. It has a side opening through which the cable extends and the device is screwed into the transom from the outside. During the installation, the device forces the cable into a hard ninety degree bend causing undue stress on the conductors in the cable.

Another solution offered by the prior art is a device known as a Cable Thru Hull Fitting, one of which is available commercially from Seachoice. This device is made of molded plastic and comprises a headed threaded shank and a threaded nut. The shank has a single external slot into which the cable fits, although users complain that the slot is undersized for many applications. The slot continues from the shank through the underside of the head, with a ninety degree bend between the slot in the shank and the slot in the underside of the head. The diameter of the shank is fairly large and a transom hole large enough to receive the shank will be large enough to accommodate some, but not all, transducer cable fittings. The design of this device also forces a cable into a hard ninety degree bend with the attendant problems mentioned above. Further, the nut cannot be rotationally locked on the threaded shank so it is subject to loosening under the vibrations generated by watercraft engines.

The devices mentioned above are limited to a single cable. Some watercraft electronic devices, for example StructureScan® sonar fish finders, have two cables and two such prior art devices, and two large transom holes are required to accommodate such two cable electronic devices. Therefore, it is desirable to provide an alternative device and apparatus for sealing around a cable, and a transom hole through which it passes, that does not force a hard bend in the cable. It is also desirable to provide such a device and apparatus which can easily accommodate at least two cables. Further, it is desirable to provide a device and apparatus in which the parts are positively prevented from loosening during use. In addition, it is desirable to provide a device and apparatus that can be installed around a cable having permanently molded connectors to obviate the cutting and splicing of the cable in order that the cable may pass through a hull or the like. These and other advantages are achieved with the pass through fitting of the present invention.

II. SUMMARY

Provided is a pass through fitting with a split bolt having a threaded shank and a nut which can be locked on the shank to prevent rotation therebetween. Grooves are provided in the interior of the split shank and the head of the bolt for receiving one or more cables. An exterior gasket is provided and can be positioned between the head of the bolt and the outside of the transom. An interior gasket is provided and may be positioned between the inside of the transom and a washer. The nut may be turned on the shank to a desired position and locked on the shank to prevent further rotation. Threaded members are provided and may be turned in threaded openings in the nut to tighten the head and the washer against the outside and the inside of the transom, respectively. When the desired tightness is achieved, the threaded members may be locked against further rotation.

III. BRIEF DESCRIPTION OF THE DRAWINGS

FIG. 6 illustrates the components of a pass through fitting according to another example of the invention.

FIG. 7 is an exterior perspective view of the elements of the fitting shown in FIG. 6 in an assembled condition.

IV. DETAILED DESCRIPTION

Watercraft owners do not want to drill holes in the hulls of their vessels. However, the use of modern day electronics that include transducers or the like requires it, so that one or more cables used to connect a device mounted on the craft to a transducer mounted outside of the watercraft, may pass through the hull. Heretofore known devices suffer one or more drawbacks. Some of them force a harsh ninety degree bend in the cable adjacent to the hull. Some do not provide adequate means for sealing around the cable. Some do not provide adequate means for sealing around the hole. Some do not provide adequate means to prevent the fittings from working loose. The presently disclosed pass through fittings address each of these drawbacks.

Provided is a pass through fitting assembly which allows a cable having an electrical fitting to be passed through a watercraft hull without the need for cutting, and then splicing the cable. The assembly provides a straight or gently curved passageway for the cable. The pass through fitting assembly provides a good tight seal and can be installed so that it will not work loose due to vibration, for example. The pass through fitting provides an internal passageway for a cable such that the cable is not bent at a sharp angle.

Figure 1:
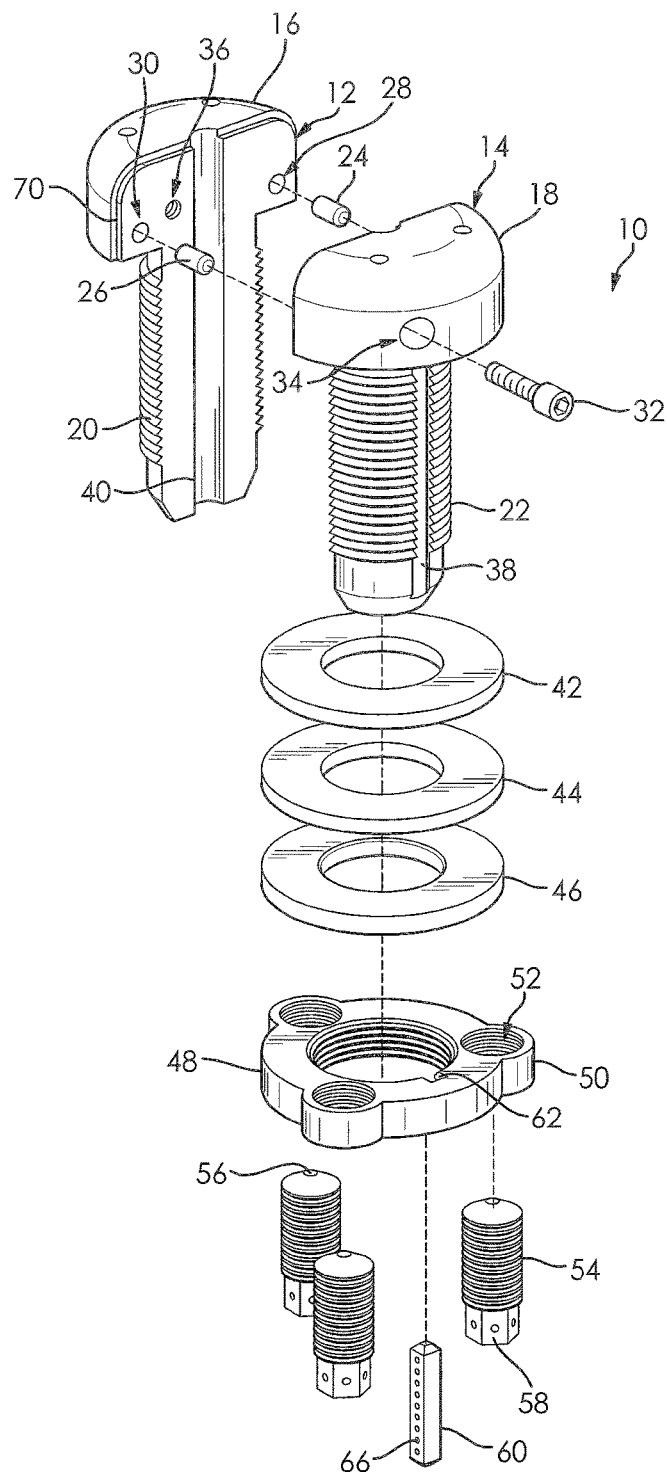
FIG. 1 illustrates the components of a pass through fitting according to one example of the invention.

An example of a pass through fitting according to the invention is indicated generally at 10 in FIG. 1. The fitting 10 comprises a split bolt with a first piece 12 and a second mating piece 14. The pieces 12 and 14 have head portions 16 and 18, and threaded shank portions 20 and 22. Locator pins 24 and 26 engage holes indicated at 28 and 30 in the head portion 16 of the split bolt first piece 12, and corresponding locator pin holes in the head portion 18 of the split bolt second piece 14 to align and maintain alignment between the split bolt first and second pieces 12 and 14. A fastener comprising a socket head cap screw 32 is received in and extends through a bore, indicated at 34, in head portion 18, and into an internally threaded bore indicated at 36 in head portion 16.

A longitudinally extending external keyseat 38 is cut in the threaded shank portion 22 of the second piece 14 of the split bolt. An internal longitudinally extending groove 40 is cut in the first piece 12 of the split bolt and a corresponding internal longitudinally extending groove is cut in the second piece 14 of the split bolt. When the first and second pieces 12 and 14 of the split bolt are brought together, the groove 40 and the corresponding groove in the second piece 14 of the split bolt align to define a longitudinally extending cable passageway extending from one end of the split bolt to the other.

A compressible exterior sealing gasket 42 is provided. The interior opening in the gasket 42 is sized to fit tightly against unthreaded portions of the threaded shank consisting of the threaded shank portions 20 and 22. A compressible interior gasket 44 is provided. The interior opening in the gasket 44 is sized so that the gasket 44 slides over the threaded portion of the threaded shank consisting of the threaded shank portions 20 and 22. A washer 46 serves as a pressure plate. The washer 46 has an opening sufficiently large that it slides easily over the threaded shank consisting of the threaded shank portions 20 and 22.

A locking nut 48 is internally threaded to engage the threads on the outside of the threaded shank consisting of the threaded shank portions 20 and 22. A plurality of bosses 50 are provided on the locking nut 48. Internally threaded, longitudinally extending bores indicated at 52 are provided on locking nut 48 within the bosses 50.

Externally threaded jack screws 54 are received in the bores 52. Washer contact surfaces 56 are provided on one end of the jack screws 54. The other end of the jack screws 54 have a torque application feature such as the hex configurations shown in FIG. 1. Bores indicated at 58 extend generally radially through the jack screws 54 at the torque application end.

A locking key 60 is provided to prevent relative rotation between the locking nut 48 and the threaded shank consisting of the threaded shank portions 20 and 22. The key 60 is received in the keyseat 38 and a keyway 62 provided on the locking nut 48.

Figure 2:
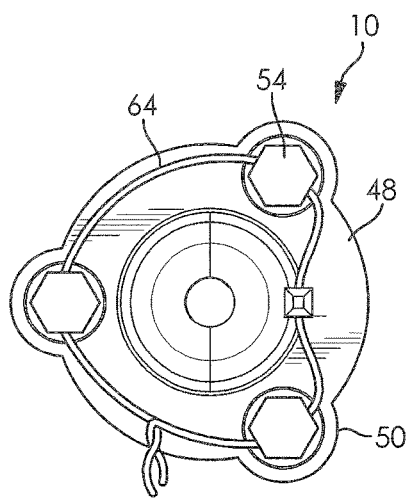
FIG. 2 illustrates an interior axial view of the installed fitting.

When the pass through fitting 10 has been assembled and installed in a hull, or the like, the jack screws may be locked to prevent undesired rotation, i.e., loosening. A safety wire 64 shown in FIG. 2 is passed through the bores 58 in the jack screws 54, and through a bore 66 (FIG. 1) in the key 60. The ends of the wire 64 are fastened as by twisting, as shown in FIG. 2, or in any other suitable manner. Engagement between the wire 64 and the jack screws 54 and the key 60, which is rotationally fixed relative to the threaded shank, comprised of the shank portions 20 and 22, and the locking nut 48, prevents rotation of the jack screws 54, and thus prevents loosening of the pass through fitting once it is installed.

Figure 3:
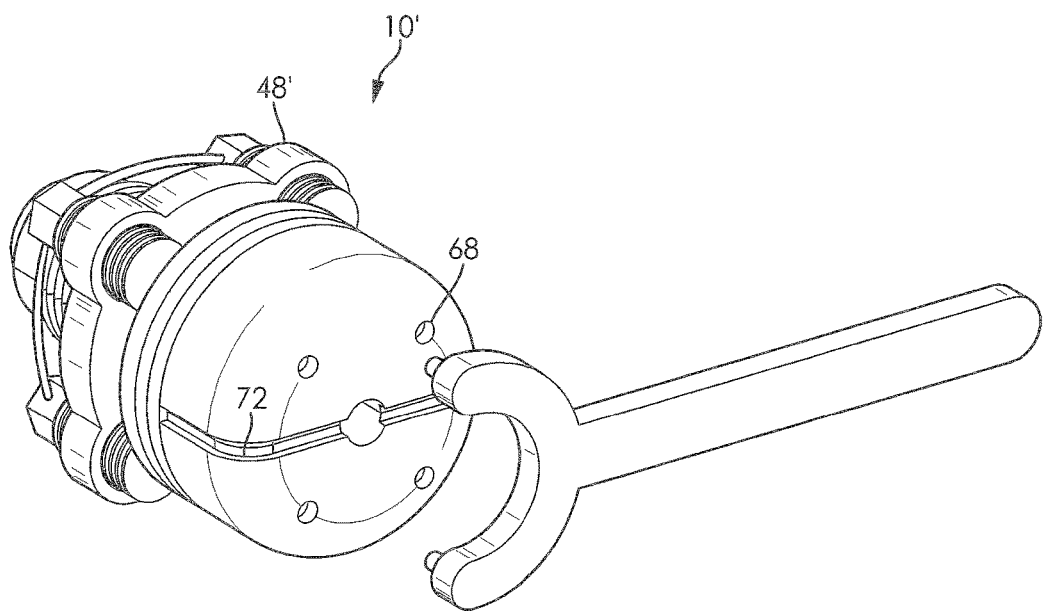
FIG. 3 is an exterior perspective view of the elements of a pass through fitting in an assembled condition.

Spanner wrench holes 68 may be provided in the head portions 16 and 18 of the split bolt, as shown in FIG. 3. A spanner wrench may be used to engage the holes 68 to prevent rotation of the split bolt during installation and removal of the pass through fitting. A groove 70 may be provided in the head portion 16 of the first piece 12 of the split bolt, as shown in FIG. 1 and a corresponding groove may be formed in the head portion 18 of the second piece 14 of the split bolt. When the first and second bolt pieces are brought together as shown in FIG. 3, the groove 70 in the head portion 16 and the cooperating groove in the head portion 18 mate to form a groove indicated at 72 in FIG. 3. As described below with reference to FIG. 12, a sealant, indicated at S, may be applied in the groove 72 to provide a seal between the head portions 16 and 18. The sealant S, like the groove, extends all the way over the head portion to opposite sides of the exterior sealing gasket 42. In addition, the sealant S is applied to and around the cable C, where it comes out of the groove 72, and is also applied to fill the cap screw hole 34.

The pass through fitting 10 may be assembled and installed as follows. A position for the cable to pass through a transom, indicated at T in FIGS. 4 and 5, or any other part of a hull, is selected and a hole is drilled therethrough. The diameter of the hole should be large enough that the molded fitting on the end of the cable will pass easily through the hole in the hull. It will be appreciated, of course, that a pass through fitting according to the present invention is admirably suited for any installation where it is desired to effect a watertight arrangement where a cable or the like is to be installed so that the cable passes through any barrier. This description will address the situation where the pass through fitting is used in connection with a cable passing through a watercraft hull. The exterior sealing gasket is positioned over the cable and the molded integral fitting on the cable is inserted into and through the transom hole from the exterior of the transom. The cable is positioned in one of the interior grooves in one of the split bolt pieces with the locator pins in the locator pin holes therein. The other piece of the split bolt is brought into mating position with the first piece, and the cap screw is inserted through the screw hole in the head portion of one split bolt piece and into the threaded hole in the head portion of the other split bolt piece, and tightened. This traps the cable inside of the internal passageway in the split bolt, and the split bolt is inserted through the transom hole.

In order, the interior gasket and the pressure plate washer are passed over the fitting and the cable and down to the split bolt. The interior gasket is slid down the cable to the split bolt and over the threads on the shank. The interior gasket is snugged up against a transom T, on the inside thereof. The split bolt is drawn further into the hole, until the head of the split bolt is against the exterior sealing gasket on the outside of the transom T. The pressure plate washer is passed over the threaded shank of the split bolt and the locking nut is slid down the cable and partially threaded onto the threads on the threaded shank. According to preferred practice, the jack screws are threaded into the bores before the nut is threaded onto the threaded shank. In this case, it is preferred that jack screws be rotated to positions where each of their washer contact surfaces are equidistant from the face of the pressure plate washer. The locking nut is turned until it touches, or nearly touches the pressure plate washer. The nut can then be backed off until the keyseat in the threaded shank and the keyway in the locking nut are aligned. The key is then inserted into the keyseat and the keyway, and the jack screws are tightened. The jack screws may be tightened by hand with a nut driver. The degree to which they are tightened will depend on a number of factors. In any case, when the tightening is stopped, the interior gasket and the exterior sealing gasket should be compressed to some degree. At this point, the outside of the pass through fitting is sealed by filling the groove 72 in the head of the split bolt with a suitable sealant. During the installation of the fitting, rotation of the split bolt may be prevented with a spanner wrench which cooperates with the spanner wrench holes 68 shown in FIG. 3.

Figures 4, 5:
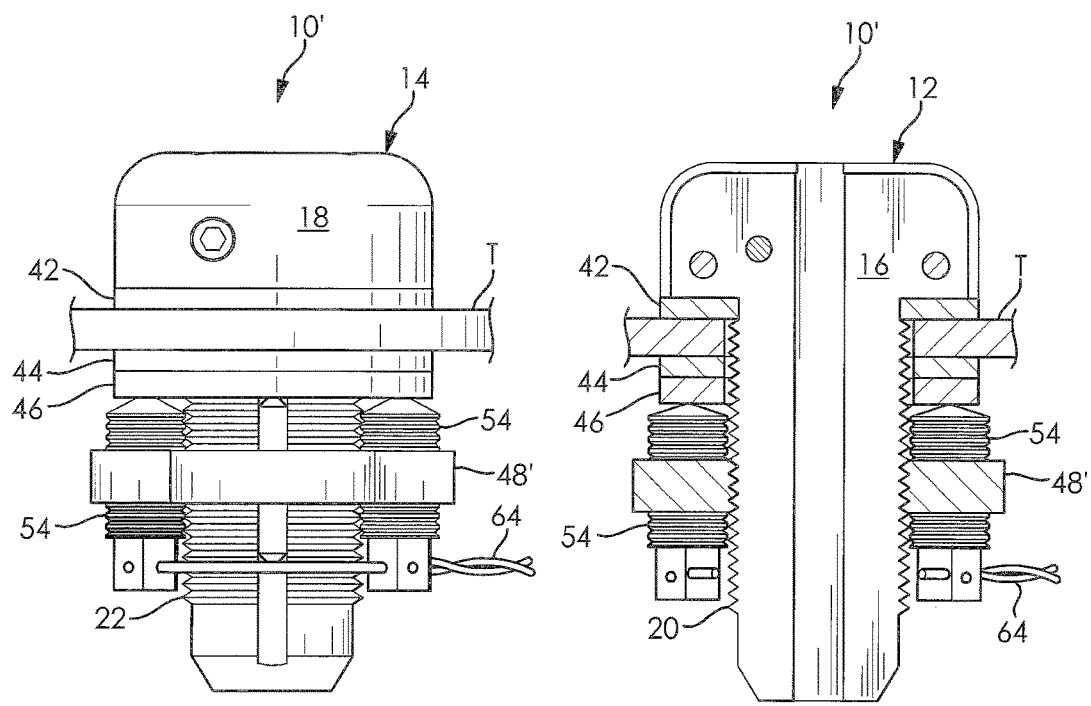
FIG. 4 is a side view of a fitting that has been installed.
FIG. 5 is a cross-sectional view of the fitting shown in FIG. 3 in an installed condition.

The pass through fitting 10 shown in FIGS. 1 and 2 is configured with three jack screw bores 52 in the locking nut 48 and, accordingly, has three jack screws 54. The pass through fittings shown in FIGS. 6 through 9, 11, and 12 also have three jack screws. In FIGS. 3 through 5, a slightly modified pass through fitting is configured with four jack screw bores in a locking nut 48'. It is preferred to have a pass through fitting with three jack screws for much the same reason as a proper milking stool has three legs—it balances regardless of the orientation and size of the legs. In other words, a pass through fitting with three jack screws automatically adjusts to apply even and substantially equal pressure against the washer 46. However, any number of jack screws may be incorporated in a pass through fitting according to the invention.

It is seen in FIG. 4 that the locking safety wire 64 engages an end of the key 60 to prevent it from working loose. This is a different arrangement than that shown in FIG. 2 where the safety wire 64 passes through a bore 66 in the key 60. It is preferred that the key 60 be positively held in place in an assembled pass through fitting to prevent it from disengaging from the keyway and the keyseat.

Turning now to FIGS. 6 and 7, a pass through fitting 10" is illustrated. It includes a split bolt piece 12' which has a curved internal groove 40'. A corresponding and mating internal groove is provided in the split bolt piece 14'. The grooves in the split bolt pieces 12' and 14' align, when the split bolt pieces 12' and 14' are assembled, to define a curved cable passageway extending from one end of the split bolt to the other. The curve in the groove 40' and the corresponding groove define a passageway that positions a cable C so that it exits the split bolt at an angle of sixty degrees offset from the longitudinal axis of the split bolt. It will be appreciated that a pass through fitting according to the invention may have an internal cable passageway that is configured so that the cable exits the passageway at other angles such as forty five degrees, ninety degrees, or any other desired angle. In selecting an angle at which the cable will exit the pass through fitting, one should keep in mind that it is preferred to have a passageway that does not have a sudden change of direction, in order to minimize stress on the cable when it is in the cable passageway. In other words, regardless of the angle at which the cable exits the split bolt, the configuration of the internal passageway should have the largest permissible bend radius. A bore 34' and a threaded bore 36' are positioned and aligned in the split bolt pieces 14' and 12' so that they, and the cap screw 32, extend radially relative to head portions 18' and 16' of the split bolt pieces 14' and 12'.

Figures 8, 9:
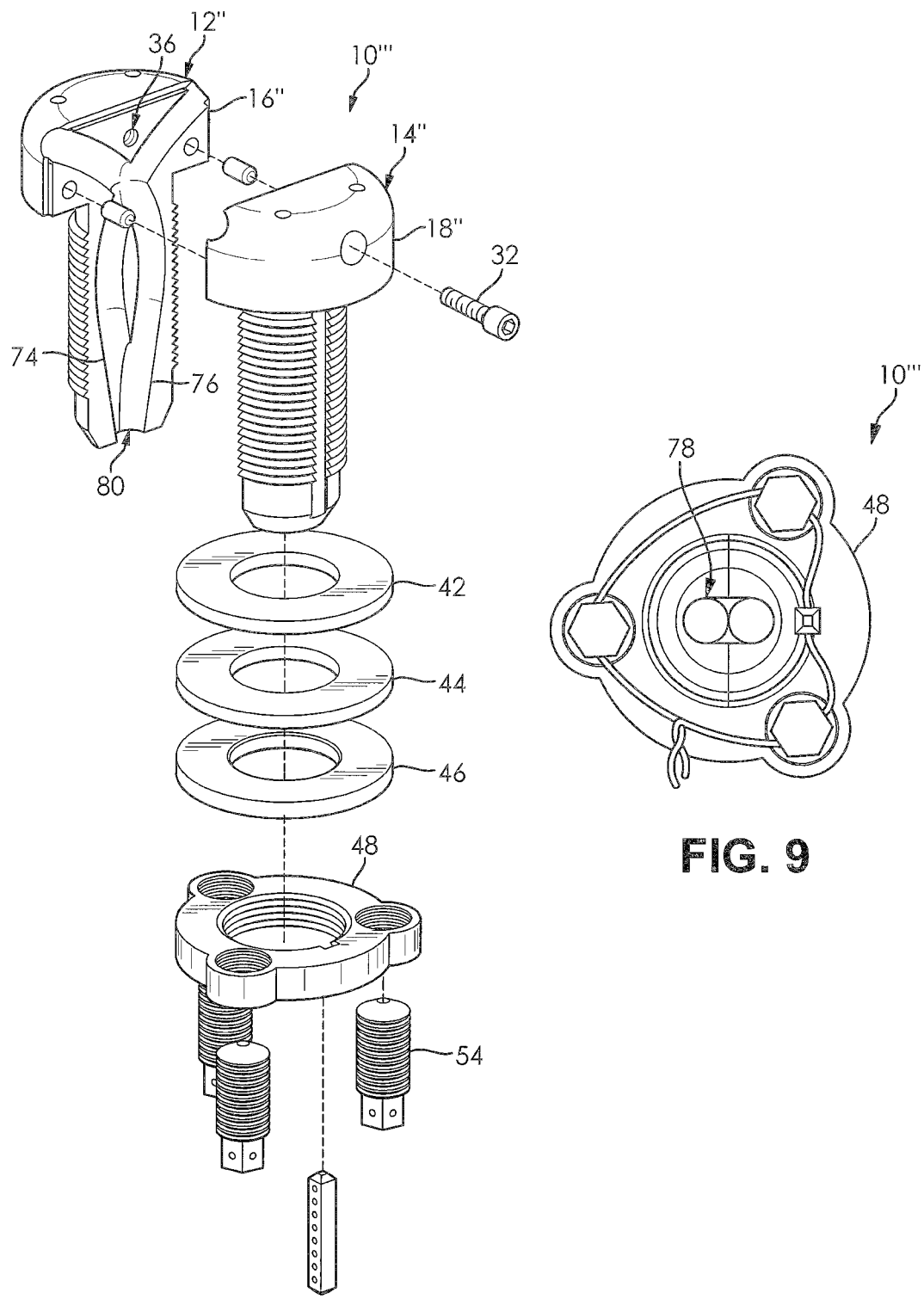
FIG. 8 illustrates the components of a pass through fitting according to yet another example of the invention.
FIG. 9 illustrates an interior axial view of the installed fitting.

Turning now to FIGS. 8 and 9, a pass through fitting 10''' is illustrated. It includes a split bolt piece 12" which has two curved internal grooves 74 and 76. Corresponding and mating internal grooves are provided in the split bolt piece 14". The grooves in the split bolt pieces 12" and 14" align, when the split bolt pieces 12" and 14" are assembled, to define two curved cable passageways extending from one end of the split bolt to the other. The curves in the groove 74 and 76 and the corresponding grooves define passageways that position two cables so that they cross inside the pass through fitting 10''', and exit the split bolt at angles of sixty degrees offset from the longitudinal axis of the split bolt, thereby maximizing the radius of the curvature of the passageways. The depths of the grooves 74 and 76 in the split bolt piece 12", and the corresponding grooves in the split bolt piece 14" vary along their paths. Where the cables exit the head of the pass through fitting, the depths of the grooves will be approximately half of the diameter of the cable. Where the grooves 74 and 76 converge at the opposite end of the split bolt piece 12", as indicated at 80, the depth of each of the grooves will correspond, approximately, with the diameter of a cable to be carried therein. The corresponding grooves in the split bolt piece 14" may be similarly configured. It will be appreciated that other passageway paths may be incorporated in a pass through fitting according to the invention. Generally speaking, the passageway entrances and exits must accommodate the size of the cable or cables passing therethrough and the cable or cables should fit relatively snugly therein.

Figure 10:
FIG. 10 illustrates an exemplary view of the exterior of a watercraft on which a fitting according to the invention has been installed.
Figure 11:
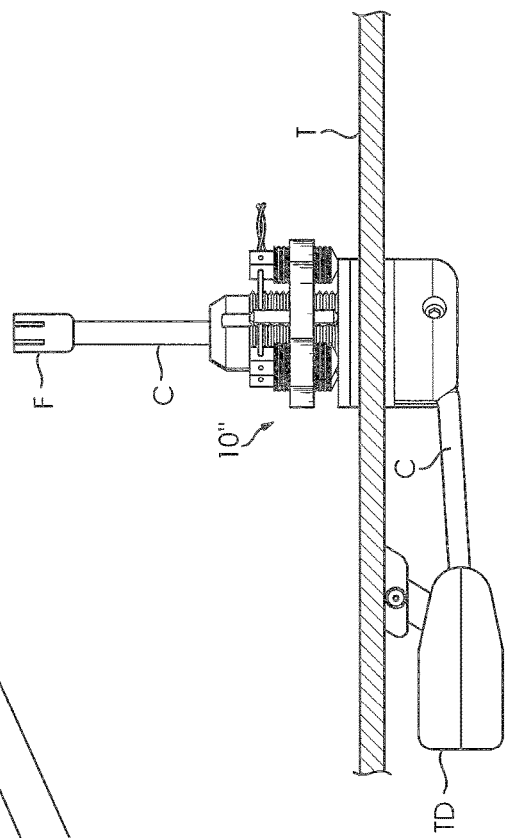
FIG. 11 is a side view of a fitting according to an example of the invention in an installed condition.

In FIG. 10, a pass through fitting according to the invention is mounted on a personal water craft ("PWC"). The pass through fitting shown in FIG. 10 corresponds with the pass through fitting 10" shown in FIGS. 6 and 7. It is to be noted that a cable C extends downwardly from the pass through fitting 10" which is appropriate in a case where a transducer connected thereto is positioned below the pass through fitting 10". During installation, a spanner wrench may be used to maintain the pass through fitting 10" in the orientation shown in FIG. 10, or in any other desired orientation. In FIG. 11, both ends of the pass through fitting installed on a transom T of a PWC are shown. A cable C with an integral molded fitting F extends from the inside of the PWC to a Transducer, indicated at TD, on the outside of the PWC. The pass through fitting 10" has been installed so that the cable extends through the transom T while the cable remains completely intact. In other words, the cable C has not been cut and there is no splice in the cable C that could compromise the integrity of the cable C.

Figure 12:
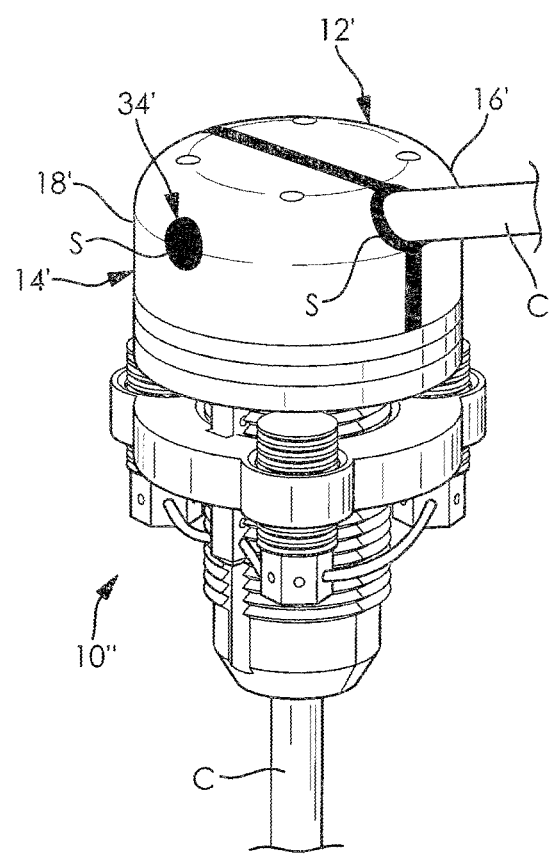
FIG. 12 is a perspective view of an assembled fitting according to an example of the invention after it has been sealed.

In FIG. 12, the pass through fitting is shown in an assembled condition after sealant indicated at S has been applied to the groove formed where the head portions 16' and 18' of the first and second pieces of the pass through fitting 10" meet. This sealant is flush with the exterior of the head of the assembled pass through fitting 10". Sealant has also been applied to seal the hole 34'. This sealant is also flush with the exterior of the head of the assembled pass through fitting 10". Sealant has also been applied at the junction where the cable C exits the internal passageway formed by the internal grooves in the head portions 16' and 18' in the split bolt pieces 12' and 14'. This sealant completely surrounds the portion of the cable C that is adjacent to the head of the pass through fitting, and covers a portion of the head that is adjacent to the cable.

The various parts of the pass through fitting may be made from materials selected from the world of materials available today, and those that may be conceived in the future. In a preferred pass through fitting according to the invention, the socket head cap screw, the locator pins, the split bolt, the locking nut, the jack screws, the pressure washer, and the key are made of 6061 T6 aluminum. The jack screws may, alternatively, be made of bronze. The gaskets are made of Neoprene®. The sealant may be 3M 4200 or 5200 Marine Adhesive Sealant.

Numerous embodiments have been described herein. It will be apparent to those skilled in the art that the above described embodiments may incorporate changes and modifications without departing from the general scope of the present disclosure. It is intended to include all such modifications and alterations in so far as they come within the scope of the appended claims or the equivalents thereof. The right to claim elements and/or sub-combinations that are disclosed herein as other inventions in other patent documents is hereby unconditionally reserved.

What is claimed is:

1. A pass through fitting comprising
a split bolt having a head and a threaded shank, said bolt being comprised of first and second pieces, said first piece and said second piece each having a head portion, a threaded shank portion, and at least one internal groove extending through said head portion and through said shank portion,
a locking nut having an internally threaded central bore engageable with said threaded shank of said bolt, said locking nut having at least one peripheral internally threaded bore extending longitudinally through said locking nut, and
at least one threaded member engageable with said at least one peripheral internally threaded bore in said threaded locking nut,
wherein, in said bolt, said at least one internal groove in said first bolt piece mates with said at least one internal groove in said second bolt piece to form an internal passageway extending through said bolt.

2. The pass through fitting claimed in claim 1 wherein there is a groove in each of said head portions of said first and second bolt pieces, adjacent to mating portions of said head portions of said first and second split bolt pieces, and said groove extends from the underside of the head portion on one side of the head portion, over the head portion, to the underside of the head portion on the opposite side.

3. The pass through fitting claimed in claim 2 and further comprising a pressure plate washer receivable on said threaded shank of said split bolt between said split bolt head and said locking nut.

4. The pass through fitting claimed in claim 1 and further comprising a key engageable with a keyseat provided in the threaded shank portion of one of said split bolt pieces, and a keyway provided on the interior of said internally threaded central bore of said locking nut.

5. The pass through fitting claimed in claim 4 and further comprising a pressure plate washer receivable on said threaded shank of said split bolt between said split bolt head and said locking nut.

6. The pass through fitting claimed in claim 4 and further comprising a safety wire engageable with said at least one threaded member and said key and operable, when so engaged, to restrict rotation of said at least one threaded member and to prevent said key from leaving said keyseat and said keyway.

7. The pass through fitting claimed in claim 2 and further comprising a key engageable with a keyseat provided in the threaded shank portion of one of said split bolt pieces, and a keyway provided on the interior of said internally threaded central bore of said locking nut.

8. The pass through fitting claimed in claim 1 wherein said locking nut has at least three peripheral internally threaded bores extending longitudinally through said locking nut, and at least three threaded members engageable with at least three peripheral internally threaded bores in said locking nut.

9. The pass through fitting claimed in claim 1 and further comprising a pressure plate washer receivable on said threaded shank of said split bolt between said split bolt head and said locking nut.

10. The pass through fitting claimed in claim 1 and further comprising an exterior sealing gasket receivable on said split bolt shank.

11. The pass through fitting claimed in claim 1 and further comprising at least one locator pin and corresponding locator pin holes in said first and second split bolt pieces.

12. The pass through fitting claimed in claim 11 and further comprising a fastener for fastening said first and second split bolt pieces together.

13. The pass through fitting claimed in claim 1 and further comprising a fastener for fastening said first and second split bolt pieces together.

14. The pass through fitting claimed in claim 1 wherein said first and second split bolt pieces have at least two internal grooves extending through said head portion and through said shank portion.

15. The pass through fitting claimed in claim 14 wherein said at least two internal grooves intersect each other at least once.

16. A pass through fitting kit comprising
a split bolt having a head and a threaded shank, said bolt being comprised of first and second pieces, said first piece and said second piece each having a head portion, a threaded shank portion, and at least one internal groove extending through said head portion and through said shank portion,
a locking nut having an internally threaded central bore engageable with said threaded shank of said bolt, said locking nut having at least three peripheral internally threaded bores extending longitudinally through said locking nut,
at least three threaded members engageable with said at least three peripheral internally threaded bores in said threaded locking nut,
a pressure plate washer receivable on said split bolt shank between said locking nut and said split bolt shank, and
a sealing gasket receivable on said split bolt shank,
wherein, in said bolt, said at least one internal groove in said first bolt piece mates with said at least one internal groove in said second bolt piece to form an internal passageway extending through said bolt.

17. The pass through fitting kit claimed in claim 16 wherein said first and second split bolt pieces have at least two internal grooves extending through said head portion and through said shank portion.

18. The pass through fitting claimed in claim 17 wherein said at least two internal grooves intersect each other at least once.

19. A split bolt for a pass through fitting comprising
a split bolt having a head and a threaded shank, said bolt being comprised of first and second pieces, said first piece and said second piece each having a head portion, a threaded shank portion, and at least one internal groove extending through said head portion and through said shank portion,
wherein, in said bolt, said at least one internal groove in said first bolt piece mates with said at least one internal groove in said second bolt piece to form an internal passageway extending through said bolt, and
wherein, said passageway is curved and extends from one end of the split bolt to the other, and
wherein the curved passageway exits the split bolt head at an angle of at least about forty five degrees offset from the longitudinal axis of the split bolt.

* * * * *